United States Patent
Hung et al.

(10) Patent No.: US 12,556,862 B2
(45) Date of Patent: Feb. 17, 2026

(54) METHOD AND CONTROL CIRCUIT FOR PERFORMING SYNCHRONIZATION ON PLAYBACK OF MULTIPLE ELECTRONIC DEVICES

(71) Applicant: Realtek Semiconductor Corp., HsinChu (TW)

(72) Inventors: Tien-Chiu Hung, HsinChu (TW); Chung-Shih Chu, HsinChu (TW); Wei-Chung Ting, HsinChu (TW); Tse-En Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 260 days.

(21) Appl. No.: 18/214,511

(22) Filed: Jun. 26, 2023

(65) Prior Publication Data

US 2023/0421954 A1   Dec. 28, 2023

(30) Foreign Application Priority Data

Jun. 28, 2022   (TW) .................................. 111124069

(51) Int. Cl.
*H04R 3/12*   (2006.01)
*H04R 29/00*   (2006.01)

(52) U.S. Cl.
CPC .............. *H04R 3/12* (2013.01); *H04R 29/002* (2013.01)

(58) Field of Classification Search
CPC .... H04R 3/12; H04R 29/002; H04R 2420/07; H04R 2227/005; H04W 56/004; H04W 56/0045; H04S 7/301; H04N 21/43076
See application file for complete search history.

(56) References Cited

U.S. PATENT DOCUMENTS

| | | | |
|---|---|---|---|
| 9,225,937 B2 | 12/2015 | Sun | |
| 10,297,266 B1* | 5/2019 | Burenius | H04R 1/406 |
| 2008/0077261 A1* | 3/2008 | Baudino | H04M 1/72412 |
| | | | 700/94 |
| 2016/0171988 A1 | 6/2016 | Vos | |
| 2018/0132038 A1 | 5/2018 | Dickins | |
| 2020/0336857 A1* | 10/2020 | Kim | H04R 5/04 |
| 2023/0247353 A1* | 8/2023 | Ali | H04S 5/00 |
| | | | 381/17 |
| 2024/0339100 A1* | 10/2024 | de Vicente Peña | H04M 9/082 |

* cited by examiner

*Primary Examiner* — Jason R Kurr
(74) *Attorney, Agent, or Firm* — Winston Hsu

(57) ABSTRACT

A method and a control circuit for performing synchronization on playback of multiple electronic devices are provided, where the multiple electronic devices include a master device and a slave device. The method includes: utilizing the master device to receive audio data from a far-end device to be master audio data, and transmitting the master audio data to the slave device to be slave audio data, where the slave device generates ultrasound data according to the slave audio data, to make the slave device play the slave audio data and the ultrasound data; utilizing a calibration circuit to estimate a delay value between the ultrasound data received by a microphone of the master device and the master audio data; and utilizing a delay circuit to control a delay of the master audio data according to the delay value, to generate master output audio data for being played by the master device.

11 Claims, 8 Drawing Sheets

METHOD AND CONTROL CIRCUIT FOR PERFORMING SYNCHRONIZATION ON PLAYBACK OF MULTIPLE ELECTRONIC DEVICES

BACKGROUND OF THE INVENTION

1. Field of the Invention

The present invention is related to playback synchronization, and more particularly, to a method and a control circuit for performing synchronization on playback of multiple electronic devices.

2. Description of the Prior Art

When making a conference-call, multiple attendees may be located in a same conference room, and these attendees may respectively utilize their own apparatuses (e.g. laptop computers) for executing conference-call software. When these separate apparatuses play sound concurrently, the respective voice outputs may interfere with one another. For example, when a far-end attendee speaks and transmits an audio message to respective laptop computers within the conference room via the conference-call software, time points of these laptop computers playing the audio may be different due to Internet or system latency. Under some conditions, playback time differences among the laptop computers may reach a few seconds, such that the audio content from different laptop computers is played one after another, worsening playback clarity in the conference room.

Thus, there is a need for a novel method and an associated control circuit, in order to solve the problem of multiple apparatuses in a same space playing audio contents of a same source with inconsistent playback time points.

SUMMARY OF THE INVENTION

An objective of the present invention is to provide a method for performing synchronization on playback of multiple electronic devices, to solve the problem of the related art without introducing any side effect or in a way that is less likely to introduce side effects.

At least one embodiment of the present invention provides a method for performing synchronization on playback of multiple electronic devices. The method comprises: utilizing a master device among the multiple electronic devices to receive audio data from a far-end device other than the multiple electronic devices to be master audio data, and transmitting the master audio data to at least one slave device among the multiple electronic devices to be slave audio data, wherein the at least one slave device generates ultrasound data according to the slave audio data, and makes a speaker of the at least one slave device play the slave audio data and the ultrasound data; utilizing a microphone of the master device to receive the ultrasound data; utilizing a calibration circuit of the master device to estimate a delay value between the ultrasound data received by the microphone of the master device and the master audio data; and utilizing a delay circuit of the master device to control a delay of the master audio data according to the delay value, to generate master output audio data for being played by a speaker of the master device.

At least one embodiment of the present invention provides a control circuit for performing synchronization on playback of multiple electronic devices, wherein the multiple electronic devices comprises a master device and at least one slave device, and the master device comprises the control circuit. The control circuit comprises a calibration circuit and a delay circuit, wherein the delay circuit is coupled to the calibration circuit. In particular, the calibration circuit is configured to take audio data received by an Internet receiver of the master device as master audio data, and estimate a delay value between ultrasound data received by a microphone of the master device and the master audio data according to the master audio data and the ultrasound data, wherein the at least one slave device receives the master audio data from the master device to be slave audio data, generates the ultrasound data according to the slave audio data, and makes a speaker of the at least one slave device play the slave audio data and the ultrasound data. In addition, the delay circuit is configured to control a delay of the master audio data according to the delay value, to generate master output audio data for being played by a speaker of the master device.

At least one embodiment of the present invention provides a control circuit for performing synchronization on playback of multiple electronic devices, wherein the multiple electronic devices comprises a master device and a slave device, and the slave device comprises the control circuit. The control circuit comprises an ultrasound modulation circuit, wherein the ultrasound modulation circuit is configured to perform ultrasound modulation on slave audio data to generate ultrasound data. For example, the slave device may receive master audio data to be the slave audio data, and the control circuit may transmit the slave audio data and the ultrasound data to a speaker of the slave device for playback. In addition, after a microphone of the master device receives the ultrasound data, the master device estimates a delay value between the ultrasound data received by the microphone of the master device and the master audio data, and controls a delay of the master audio data according to the delay value, to generate master output audio data for being played by a speaker of the master device.

The method and the control circuit provided by the embodiments of the present invention can estimate playback delay differences of respective electronic devices with the aid of ultrasound transmission and detection, and accordingly compensate these differences. By the mechanism mentioned above, playback of respective electronic devices can be synchronized. In addition, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
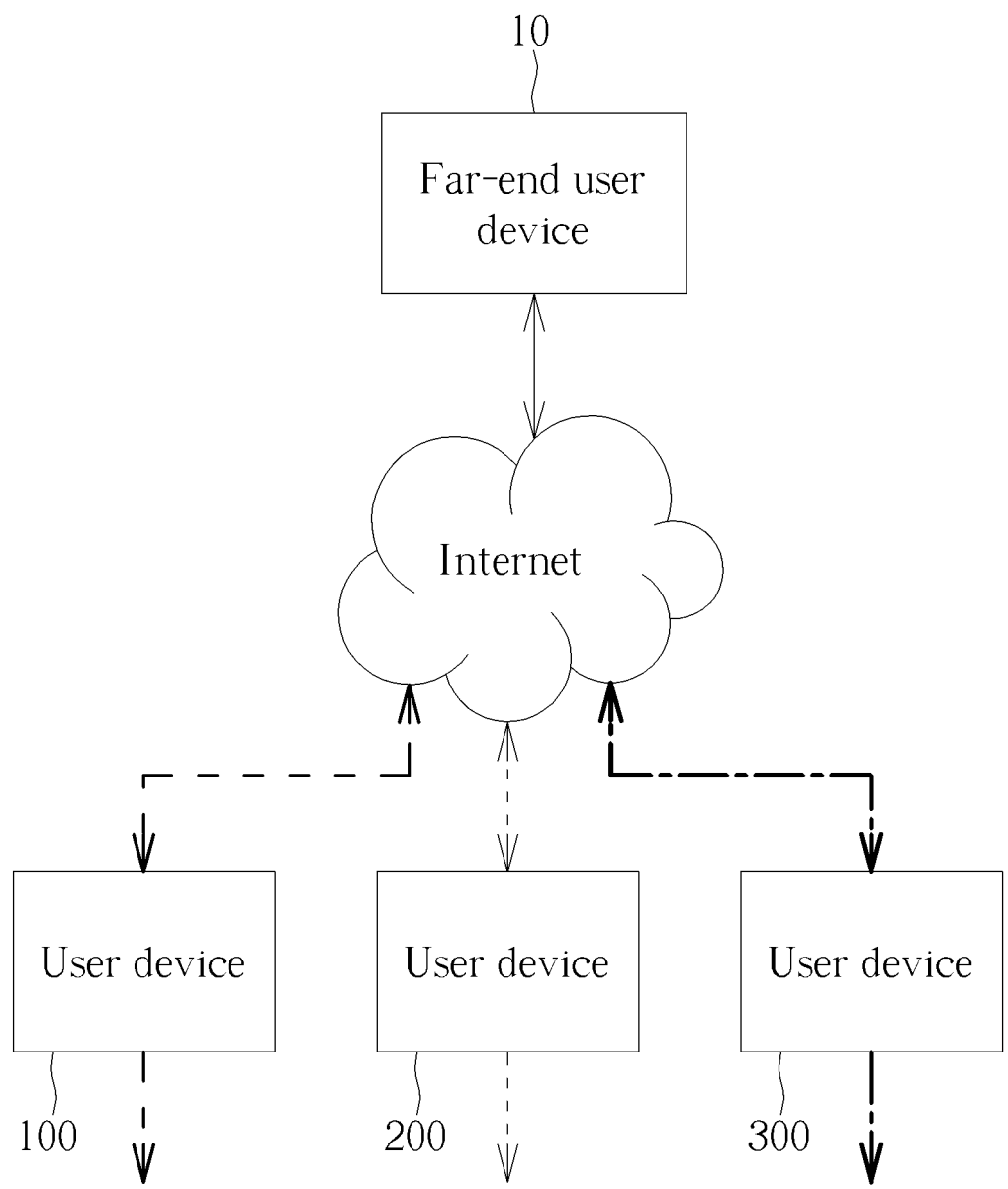
FIG. 1 is a diagram illustrating multiple electronic devices making a conference-call in a same space according to an embodiment of the present invention.

FIG. 1 is a diagram illustrating multiple electronic devices such as user devices 100, 200 and 300 making a conference-call in a same space according to an embodiment of the present invention. In this embodiment, multiple users in a same conference room may respectively utilize the user devices 100, 200 and 300 to make a conference-call with a far-end user (e.g. a user utilizing far-end user device 10) who is not in the conference room, where the far-end user device and each of the user devices 100, 200 and 300 may be a desktop computer, a laptop computer, a smart phone or any electronic device capable of executing a conference-call software. As shown in FIG. 1, when an audio message of the far-end user is transmitted over the Internet via the far-end user device 10, the user devices 100, 200 and 300 may utilize respective network interfaces (e.g. respective wired/wireless network interfaces) to obtain the audio message from the far-end user device 10 through the Internet, and then respectively play the audio message. For better comprehension, FIG. 1 utilizes different types of dashed lines to show a configuration of the user devices 100, 200 and 300 respectively obtaining the audio message and playing the audio message. As the user devices 100, 200 and 300 may be products of different manufacturers, the wired/wireless network interfaces, associated processing circuits and playback equipment within the user devices 100, 200 and 300 may have different specifications and performances. Thus, under the configuration of the user devices 100, 200 and 300 respectively obtaining and playing the audio message, even though the user devices 100, 20 and 300 play the same contents, the playback time points of the user devices 100, 200 and 300 may be inconsistent.

Figure 2:
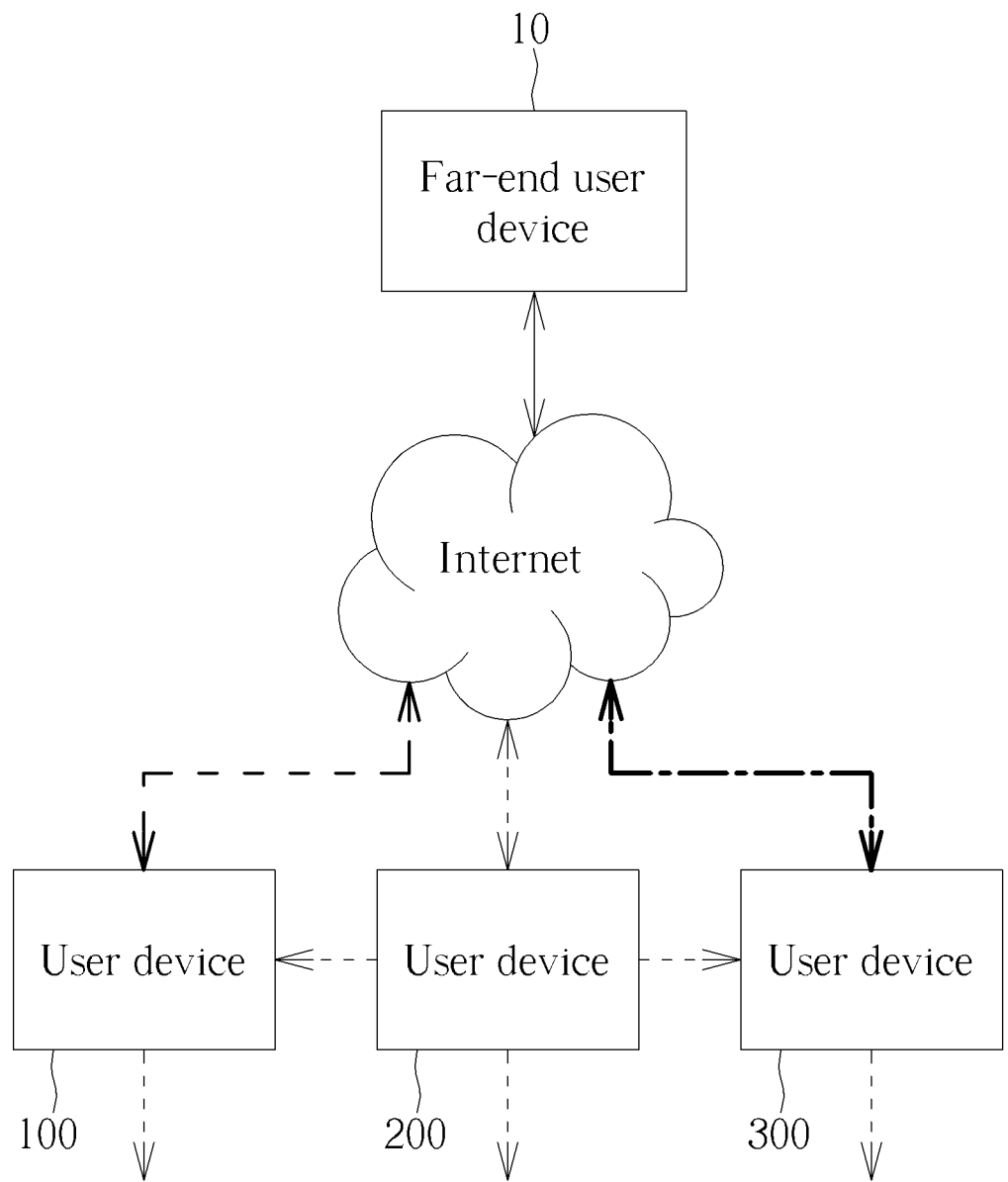
FIG. 2 is a diagram illustrating multiple electronic devices making a conference-call in a same space according to another embodiment of the present invention.

FIG. 2 is a diagram illustrating the user devices 100, 200 and 300 making the conference-call in the same space according to another embodiment of the present invention. In this embodiment, the user device 200 in this embodiment may serve as a master device, and the remaining devices such as the user devices 100 and 300 may serve as slave devices. In comparison with the embodiment of FIG. 1, the user device 200 not only plays the audio data obtained from the Internet, but also transmits the audio data to the user devices 100 and 300. Although the user device 100 and 300 can still obtain the audio data from the far-end user device 10 through the Internet, the user devices 100 and 300 play the audio data received from the user device 200 instead. Thus, the problems of Internet delay differences caused by the wired/wireless network interfaces can be solved. In addition, for compensating a delay of transmission between the user devices 200 and 100/300 and/or associated system delay(s), each of the user devices 100, 200 and 300 may comprise an associated control circuit for synchronizing playback of the user devices 100, 200 and 300.

Figure 3:
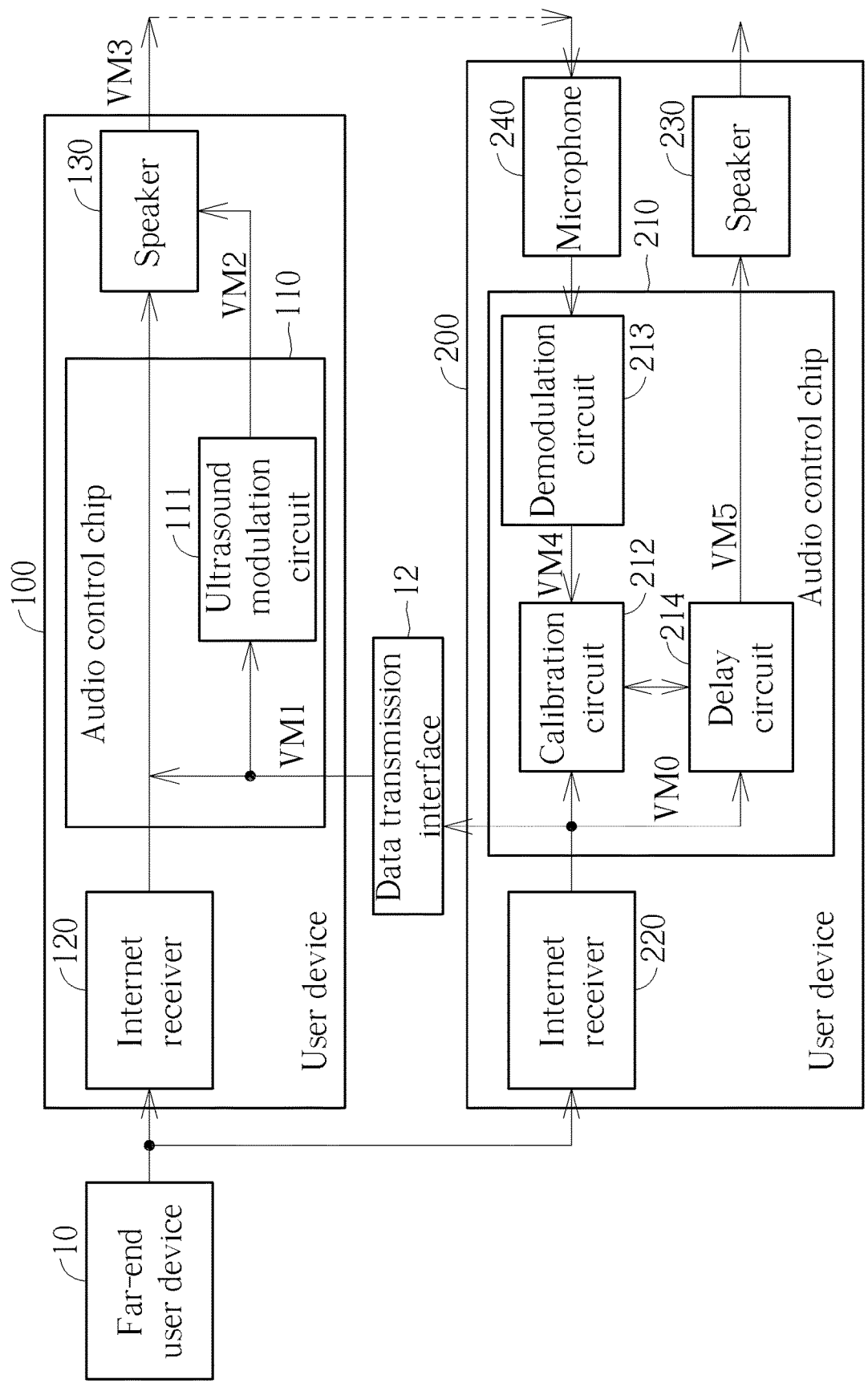
FIG. 3 is a diagram illustrating performing synchronization on playback of multiple electronic devices according to an embodiment of the present invention.

FIG. 3 is a diagram illustrating performing synchronization on playback of the user devices 100 and 200 according to an embodiment of the present invention. In this embodiment, the user device 100 may serve as a slave device and the user device 200 may serve as a master device. As shown in FIG. 3, the user device 100 may comprise an audio control chip 110, an Internet receiver 120 and a speaker 130, and the user device 200 may comprise an audio control chip 210, an Internet receiver 220, a speaker 230 and a microphone 240, where the user device 100 and the user device 200 may be coupled to each other via a data transmission interface 12. It should be noted that the data transmission interface 12 shown in FIG. 3 is for illustrative purposes only, and is not meant to be a limitation of the present invention. For example, the data transmission interface 12 may be a physical cable. In another example, the data transmission interface 12 may be implemented with a wired or wireless local area network. As long as the user device 200 can transmit data to the user device 100 via the data transmission interface 12, detailed implementations of the data transmission interface 12 may vary.

In this embodiment, the Internet receiver 220 of the user device 200 may receive audio data from the far-end user device 10 through the Internet to be master audio data VM0, and the user device 200 may transmit the master audio data VM0 to the user device 100 via the data transmission interface 12, to be slave audio data VM1. It should be noted that although the Internet receiver 120 of the user device 100 can still obtain the audio data from the far-end user device 10, the audio control chip 110 may directly discard the audio data obtained by the Internet receiver 120. In this embodiment, the user device 100 may generate ultrasound data VM2 according to the slave audio data VM1, to make the speaker 130 play the slave audio data VM1 and the ultrasound data VM2. For example, audio data VM3 played by the speaker 130 may comprise the slave audio data VM1 and the ultrasound data VM2. In detail, the audio control chip 110 may comprise an ultrasound modulation circuit 111, where the ultrasound modulation circuit 111 may be configured to perform ultrasound modulation on the slave audio data VM1 to generate the ultrasound data VM2. It should be noted that both the master audio data VM0 and the slave audio data VM1 are within an audible frequency range (e.g. a frequency band between 20 Hertz and 20,000 Hertz, which may be referred to as a hearing range), and the ultrasound data VM2 is within an ultrasound frequency band (e.g. a frequency band over 20,000 Hertz).

After the microphone 240 of the user device 200 receives the audio data VM3 (more particularly, the ultrasound data VM2 therein), the user device 200 may estimate a delay value between the audio data VM3 (e.g. the ultrasound data VM2 therein) and the master audio data VM1, and control a delay of the master audio data VM0 according to the delay value, in order to generate master audio data VM5 for being played by the speaker 230 of the user device 200. In this embodiment, the audio control chip 210 of the user device 200 may comprise a calibration circuit 212, a demodulation circuit 213 and a delay circuit 214, where the calibration circuit 212 is coupled to the demodulation circuit 213, and the delay circuit 214 is coupled to the calibration circuit 212. In this embodiment, the demodulation circuit 213 may be configured to perform demodulation on the ultrasound data VM2 within the audio data VM3 received by the microphone 240 to generate baseband data VM4, where the baseband data VM4 is within the audible frequency range. The calibration circuit 212 may estimate a delay value between the ultrasound data VM2 within the audio data VM3 (or the slave audio data VM1 within the audio data VM3) and the master audio data VM0 according to the master audio data VM0 and the ultrasound data VM2 within the audio data VM3 received by the microphone 240, and more particularly, may compare the baseband data VM4 and the master audio data VM0 in order to estimate the delay value. In addition, the delay circuit 214 may control a delay of the master audio data VM0 according to the delay value, in order to generate master output audio data VM5 for being played by the speaker 230. For example, the delay circuit 214 may apply the delay value to the master audio data VM0 to generate the master output audio data VM5, to synchronize the slave audio data VM1 within the audio data VM3 played by the speaker 130 with the master output audio data VM5 played by the speaker 230.

The embodiment of FIG. 3 takes the user devices 100 and 200 for example, where the synchronization operation between the user devices 100 and 300 may be deduced by analogy. In addition, the embodiment of FIG. 3 takes the user device 200 as the master device and takes the user device 100 (or the user device 300) as the slave device, so the audio control chip 210 equipped in the user device 200 serving as the master device and the audio control chip 110 equipped in in the user device 100 serving as the slave device may have different architectures. This is for illustrative purposes only, and is not meant to be a limitation of the present invention. For example, the user devices 100, 200 and 300 may have the same architecture, where any one of the user devices 100, 200 and 300 may serve as the master device, and any of the other devices may serve as the slave device.

Figure 4:
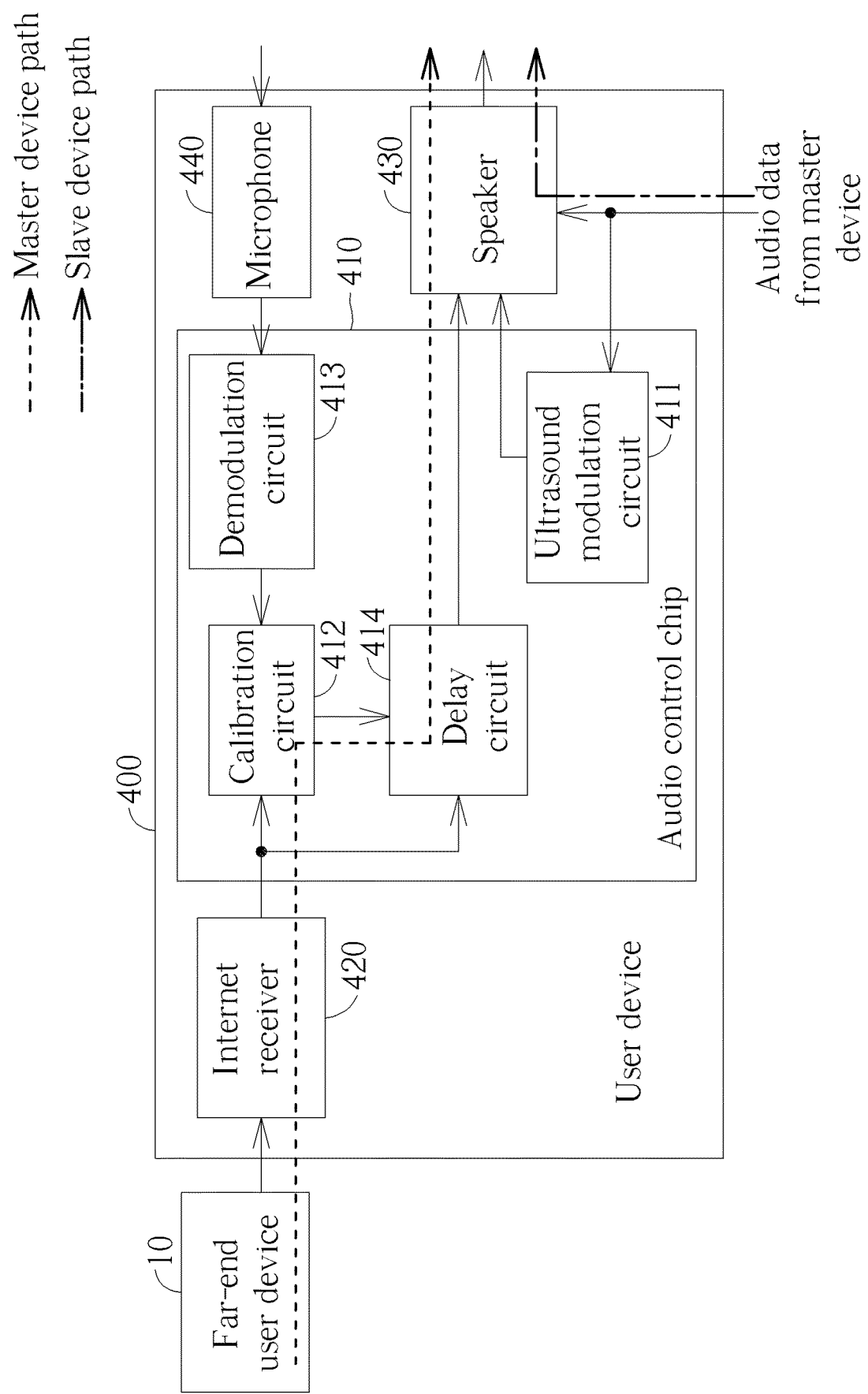
FIG. 4 is a diagram illustrating an electronic device which is capable of selectively serving as one of a master device and a slave device according to an embodiment of the present invention.

FIG. 4 is a diagram illustrating a user device 400 which is capable of selectively serving as one of a master device and a slave device according to an embodiment of the present invention, where the user device 400 may be an example of any (e.g. each) of multiple electronic devices in a same space, such as the user devices 100, 200 and 300. As shown in FIG. 4, the user device 400 may comprise an audio control chip 410, an Internet receiver 420, a speaker 430 and a microphone 440, where operations of the Internet receiver 420, the speaker 430 and the microphone 440 are similar to the operations of the Internet receivers 120 and 220, the speakers 130 and 230, and the microphone 240, and related details are not repeated here for brevity. In this embodiment, the audio control chip 410 may comprise the ultrasound modulation circuit 411, the calibration circuit 412, the demodulation 412 and the delay circuit 414. When the user device 400 serves as the master device, the user device 400 may transmit audio data (e.g. the master audio data VM0 mentioned in the embodiment of FIG. 3) received by the Internet receiver 420 to one or more user devices which serve as slave devices. After the microphone 440 receives audio data (e.g. the ultrasound data VM2 within the audio data VM3 mentioned in the embodiment of FIG. 3) played by the one or more user devices, the audio control chip 410 may utilize the calibration circuit 412, the demodulation circuit 413 and the delay circuit 414 to accordingly perform delay estimation and compensation, to synchronize audio data played by the speaker 430 with the audio data played by the one or more user devices. Related details of the calibration circuit 412, the demodulation circuit 413 and the delay circuit 414 are similar to, respectively, the calibration circuit 212, the demodulation circuit 213 and the delay circuit 214 mentioned in the embodiment of FIG. 3, and are not repeated here for brevity. When the user device 400 serves as the slave device, the user device 400 may discard the audio data received by the Internet receiver 420, and receive audio data (e.g. the slave audio data VM1 mentioned in the embodiment of FIG. 3) from a user device which serves as the master device, where the audio control chip 410 may utilize the ultrasound modulation circuit 411 to perform associated processing on the audio data from the master device, and then control the speaker 430 to play the processed audio data (e.g. the audio data VM3 mentioned in the embodiment of FIG. 3), to allow the microphone of the master device to receive the audio data played by the speaker 430 for performing delay estimation and compensation. Related details of the ultrasound modulation circuit 411 are similar to the ultrasound modulation circuit 111 mentioned in the embodiment of FIG. 3, and are not repeated here for brevity.

The embodiment of FIG. 3 takes synchronization of two electronic devices for illustration, but the present invention is not limited thereto. As shown in FIG. 2, when the user device 200 serves as the master device, user devices serving as the slave devices may include the user device 100 and the user device 300. Under this condition, the user device 100 and the user device 300 may serve as a first slave device and a second slave device, respectively, where the user device 100 may receive the master audio data (e.g. the master audio data VM0 shown in FIG. 3) to be first slave audio data, and the user device 300 may receive the master audio data to be second slave audio data.

Figure 5:
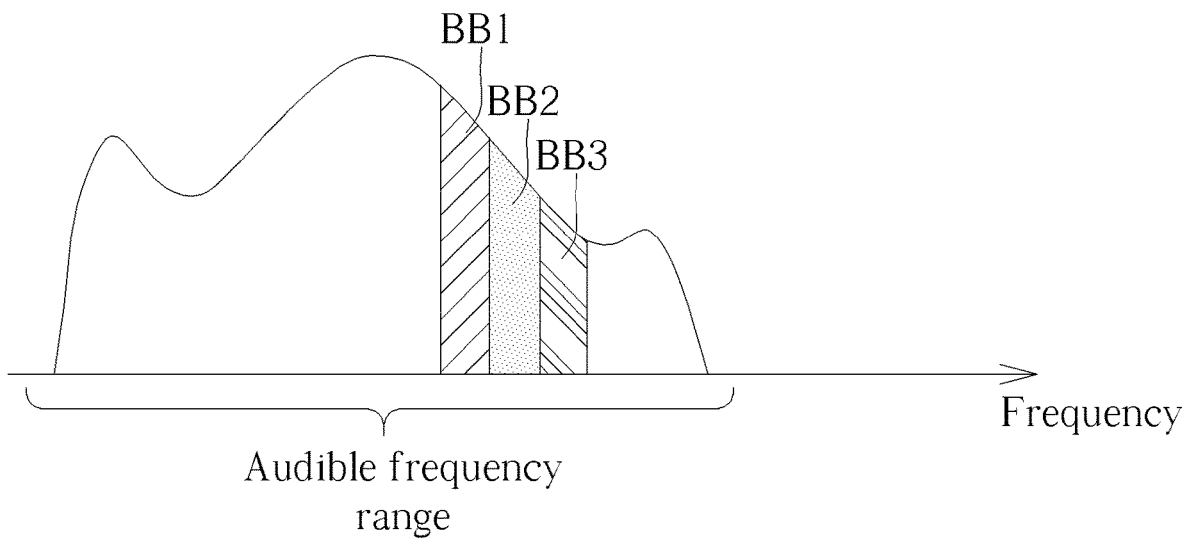
FIG. 5 is a diagram illustrating a frequency spectrum of audio data according to an embodiment of the present invention.
Figure 6:
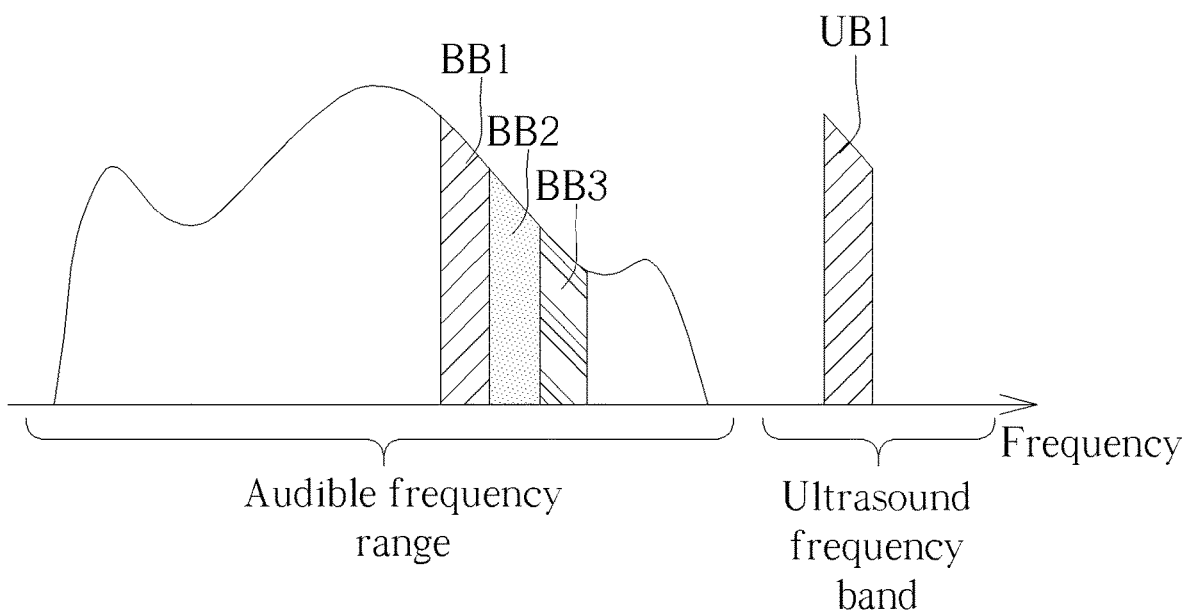
FIG. 6 is a diagram illustrating a frequency spectrum of audio data played by a speaker of a first slave device according to an embodiment of the present invention.
Figure 7:
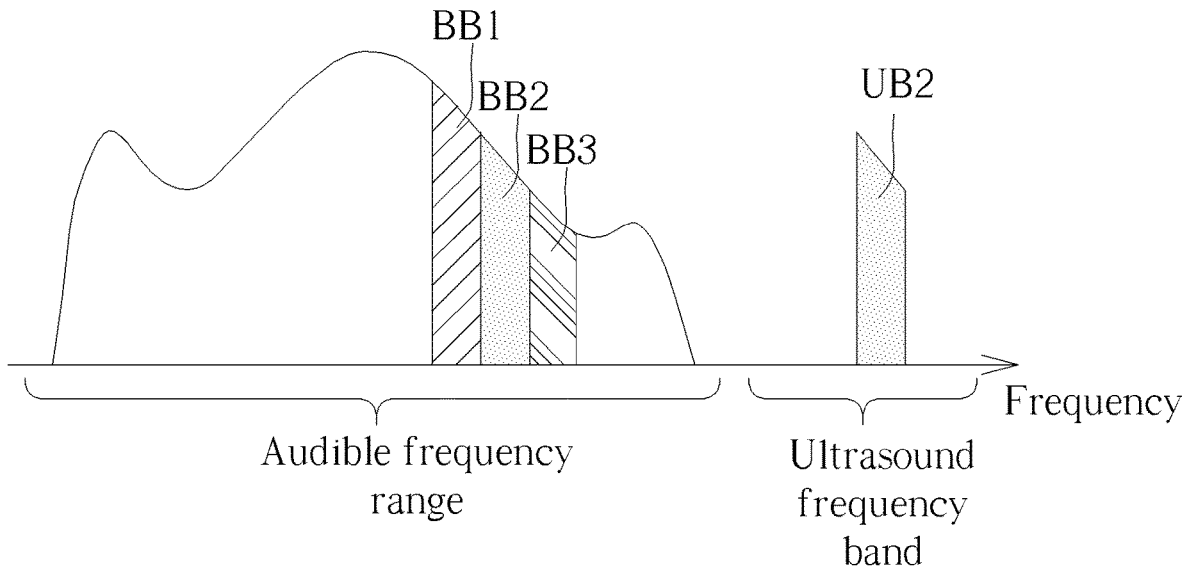
FIG. 7 is a diagram illustrating a frequency spectrum of audio data played by a speaker of a second slave device according to an embodiment of the present invention.

FIG. 5 is a diagram illustrating a frequency spectrum of audio data according to an embodiment of the present invention, where the audio data shown in FIG. 5 may be an example of any (e.g. each) of the master audio data of the user device 200, the first slave audio data of the user device 100 and the second slave audio data of the user device 300. In detail, the user device 100 may generate first ultrasound data such as ultrasound data UB1 shown in FIG. 6 according to a first portion of the first slave audio data (e.g. audio data BB1 within a first frequency band), to make the speaker of the user device 100 play the ultrasound data UB1 within the ultrasound frequency band and the first slave audio data within the audible frequency band. In addition, the user device 300 may generate second ultrasound data such as ultrasound data UB2 shown in FIG. 7 according to a second portion of the second slave audio data (e.g. audio data BB2 within a second frequency band), to make the speaker of the user device 300 play the ultrasound data UB2 within the ultrasound frequency band and the second slave audio data within the audible frequency band. In particular, the first frequency band may be different from the second frequency band, where the user device 100 generates the ultrasound data UB1 by performing ultrasound modulation on the audio data BB1, and the user device 300 generates the ultrasound data UB2 by performing ultrasound modulation on the audio data BB2. After the microphone of the user device 200 receives the audio data (e.g. the ultrasound data UB1 and the first slave audio data shown in FIG. 6) played by the speaker of the user device 100, the user device 200 may utilize the calibration circuit 212 therein to estimate a first delay value between the ultrasound data UB1 (e.g. baseband data which is generated by utilizing the demodulation circuit 213 to perform demodulation on the ultrasound data UB1) received by the microphone of the user device 200 and the baseband data BB1 within the master audio data. In addition, after the microphone of the user device 200 receives the audio data (e.g. the ultrasound data UB2 and the second slave audio data shown in FIG. 7) played by the speaker of the user device 300, the user device 200 may utilize the calibration circuit 212 therein to estimate a second delay value between the ultrasound data UB2 (e.g. baseband data which is generated by utilizing the demodulation circuit 213 to perform demodulation on the ultrasound data UB2) received by the microphone of the user device 200 and the baseband data BB2 within the master audio data. Thus, the user device 200 may determine a delay value that is to be applied to the master audio data according to the first delay value and the second delay value.

When the first delay value is greater than the second delay value, the user device 200 may set the delay value applied to the master audio data with the first delay value, to synchronize the audio data played by the speaker of the user device 200 with the audio data played by the speaker of the user device 100. In addition, the calibration circuit 212 of the user device 200 may calculate a delay difference between the first delay value and the second delay value, and apply the delay difference to the second slave audio data to generate slave output audio data for being played by the speaker of the user device 300. For example, the user device 200 may apply the delay difference to the master audio data to generate delayed audio data, and transmit the delayed audio data to the user device 300. In another example, the user device 200 may transmit the master audio data in conjunction with information carrying the delay difference to the user device 300, to allow the user device 300 to apply the delay difference to the second slave audio data to generate delayed audio data for being played by the speaker of the user device 300. Thus, the present invention can find the slave device which has the most severe delay, and then align playback time of audio data of the master device and the rest of the slave devices with the slave device having the most severe delay, thereby achieving the purpose of synchronization.

In addition, if any delay value among the first delay value and the second delay value exceeds a threshold, the user device 200 may set the slave device among the user device 100 and the user device 300 which corresponds to the delay vale exceeding the threshold to be mute. For example, when the first delay value exceeds the threshold and the second delay value does not exceed the threshold, the user device 200 may send a mute request to the user device 100 to set the user device 100 to be mute, where the user device 200 may set the delay value applied to the master audio data with the second delay value, in order to synchronize the audio content played by the user device 200 with the audio content played by the user device 300. In another example, when both of the first delay value and the second delay value exceed the threshold, the user device 200 may send a mute request to each of the user devices 100 and 300, to set both of the user devices 100 and 200 to be mute.

Figure 8:
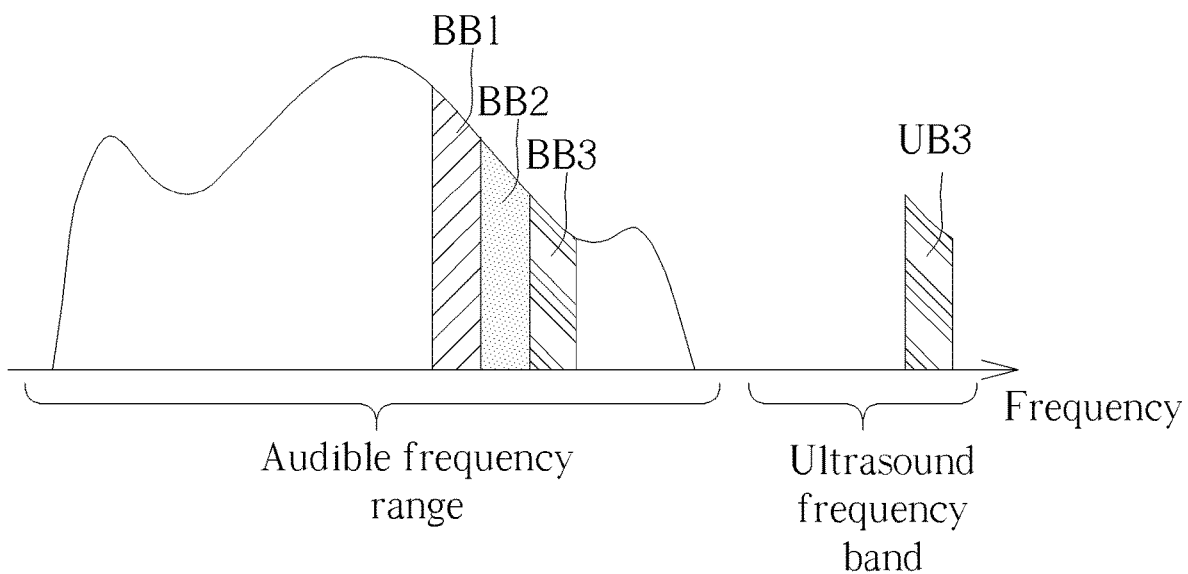
FIG. 8 is a diagram illustrating a frequency spectrum of audio data played by a speaker of a third slave device according to an embodiment of the present invention.

In addition, if there are three or more slave devices, associated operations may be deduced by analogy. For example, a third slave device may generate third ultrasound audio data such as ultrasound data UB3 shown in FIG. 8 for playback according to a third portion of the audio data (e.g. audio data BB3 within a third frequency band). According to the above description, those skilled in this art should understand how to estimate a delay condition of the third slave device by referring to the ultrasound data UB3, and related details are therefore omitted here for brevity. It should be noted that as the audio data BB1, BB2 and BB3 are data within different respective frequency bands (e.g. the first frequency band, the second frequency band and the third frequency band). Thus, according to the frequency band to which currently received ultrasound data (or a demodulated result) belongs, the user device which serves as the master audio device can determine to which slave device that a currently estimated delay value corresponds.

Figure 9:
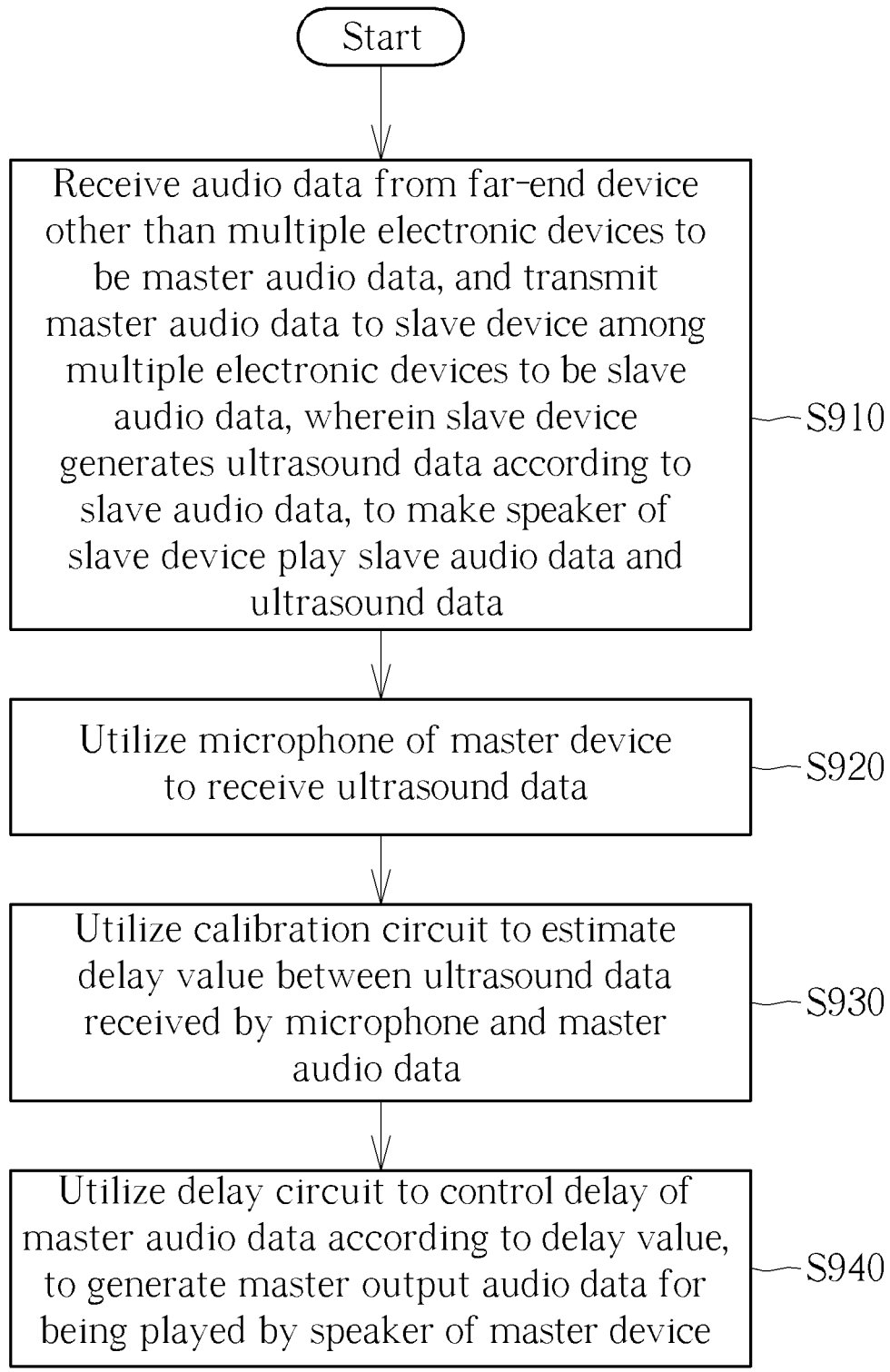
FIG. 9 is a diagram illustrating a working flow of a method for performing synchronization on playback of multiple electronic devices according to an embodiment of the present invention.

FIG. 9 is a diagram illustrating a working flow of a method for performing synchronization on playback of multiple electronic devices according to an embodiment of the present invention, where the user devices 100, 200 and 300 may be examples of the multiple electronic devices. It should be noted that one or more steps may be added, deleted or modified in the working flow shown in FIG. 9. In addition, if an overall result is not hindered, these steps do not have to be executed in the exact order shown in FIG. 9.

In Step S910, a master device (e.g. the user device 200 shown in FIG. 2) among the multiple electronic devices may receive audio data from a far-end device other than the multiple electronic devices to be master audio data, and transmit the master audio data to at least one slave device (e.g. any of the user devices 100 and 300 shown in FIG. 2) among the multiple electronic devices to be slave audio data, wherein the at least one slave device may generate ultrasound data according to the slave audio data, to make a speaker of the at least one slave device play the slave audio data and the ultrasound data.

In Step S920, the master device may utilize a microphone thereof to receive the ultrasound data.

In Step S930, the master device may utilize a calibration circuit thereof to estimate a delay value between the ultrasound data received by the microphone of the master device and the master audio data.

In Step S940, the master device may utilize a delay circuit thereof to control a delay of the master audio data according to the delay value, to generate master output audio data for being played by a speaker of the master device.

Figure 10:
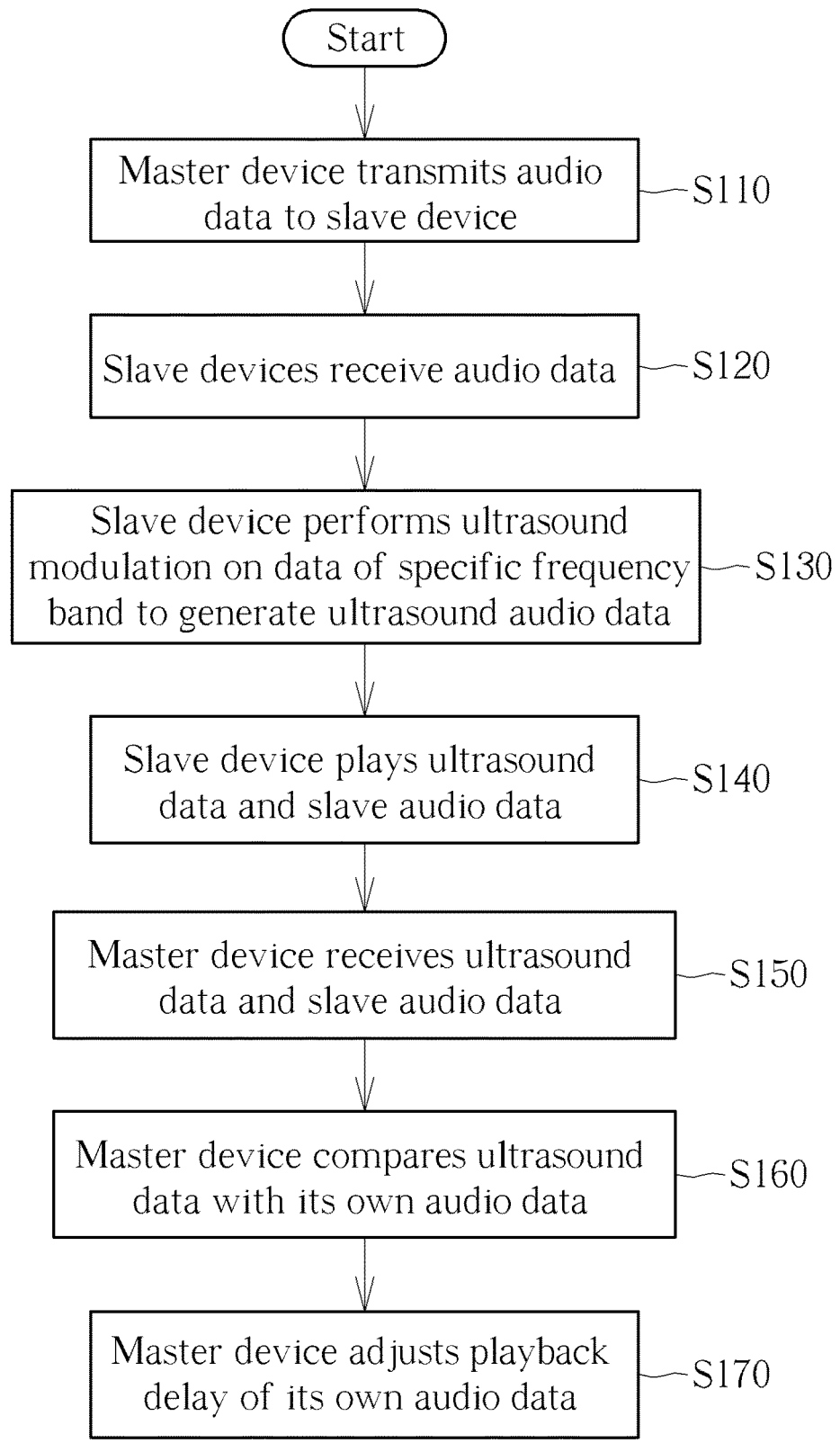
FIG. 10 is a diagram illustrating an example of the method shown in FIG. 9.

FIG. 10 is a diagram illustrating an example of the method shown in FIG. 9, where one or more steps may be added, deleted or modified in the working flow shown in FIG. 10. In addition, if an overall result is not hindered, these steps do not have to be executed in the exact order shown in FIG. 10.

In Step S110, a master device (e.g. the user device 200 shown in FIG. 2) may transmit audio data (e.g. the master audio data mentioned above) to a slave device (e.g. any of the user devices 100 and 300).

In Step S120, the slave device may receive the audio data to be slave audio data.

In Step S130, the slave device may perform ultrasound modulation on data of a specific frequency band within the slave audio data to generate ultrasound audio data.

In Step S140, the slave device may play the ultrasound data and the slave audio data via a speaker thereof.

In Step S150, the master device may receive the ultrasound data and the slave audio data via a microphone thereof.

In Step S160, the master device may compare the ultrasound data with its own audio data (e.g. the master audio data mentioned above) to estimate a delay value.

In Step S170, the master device may adjust a playback delay of its own audio data according to the delay value.

To summarize, the method and the control circuit provided by the embodiments of the present invention utilize ultrasound signals to carry data which is played from slave device(s), to allow a master device to receive the ultrasound signal via a microphone thereof and accordingly estimate a playback delay of the slave device(s). Thus, after the playback delay of the slave device(s) is estimated, the master device can perform corresponding compensation on itself or a respective slave device, to synchronize playback of multiple electronic devices in the same space. In addition, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing synchronization on playback of multiple electronic devices, comprising:
    utilizing a master device among the multiple electronic devices to receive audio data from a far-end device other than the multiple electronic devices to be master audio data, and transmitting the master audio data to at least one slave device among the multiple electronic devices to be slave audio data, wherein the at least one slave device generates ultrasound data according to the slave audio data, to make a speaker of the at least one slave device play the slave audio data and the ultrasound data;
    utilizing a microphone of the master device to receive the ultrasound data;
    utilizing a calibration circuit of the master device to estimate a delay value between the ultrasound data received by the microphone of the master device and the master audio data; and
    utilizing a delay circuit of the master device to control a delay of the master audio data according to the delay value, to generate master output audio data for being played by a speaker of the master device, synchronizing the master output audio played by the speaker of the master device with the slave audio data played by the speaker of the at least one slave device;
    wherein the at least one slave device comprises multiple slave devices, a first slave device among the multiple slave devices receives the master audio data from the master device to be first slave audio data, a second slave device among the multiple slave devices receives the master audio data from the master device to be second slave audio data, the first slave device generates first ultrasound data according to a first portion of the first slave audio data to make the first slave device play the first ultrasound data and the first slave audio data, and the second slave device generates second ultrasound data according to a second portion of the second slave audio data to make the second slave device play the second ultrasound data and the second slave audio data, wherein the first portion of the first slave audio data corresponds to a first portion of the master audio data, the second portion of the second slave audio data corresponds to a second portion of the master audio data, and utilizing the calibration circuit of the master device to estimate the delay value between the ultrasound data received by the microphone of the master device and the master audio data comprises:
        utilizing the calibration circuit to estimate a first delay value between the first ultrasound data received by the microphone of the master device and the master audio data;
        utilizing the calibration circuit to estimate a second delay value between the second ultrasound data received by the microphone of the master device and the master audio data; and
        determining the delay value according to the first delay value and the second delay value;
        wherein determining the delay value according to the first delay value and the second delay value comprises:
            in response to the first delay value being greater than the second delay value, setting the delay value by the first delay value.

2. The method of claim 1, wherein the at least one slave device performs ultrasound modulation on at least one portion of the slave audio data to generate the ultrasound data.

3. The method of claim 2, wherein utilizing the calibration circuit of the master device to estimate the delay value between the ultrasound data received by the microphone of the master device and the master audio data comprises:
    utilizing a demodulation circuit of the master device to perform demodulation on the ultrasound data received by the microphone of the master device to generate baseband data; and
    utilizing the calibration circuit to compare the baseband data with the master audio data to estimate the delay value.

4. The method of claim 1, further comprising:
    in response to any delay value among the first delay value and the second delay value exceeding a threshold, setting a slave device among the first slave device and the second slave device which corresponds to said any delay value exceeding the threshold to be mute.

5. The method of claim 1, wherein the master audio data and the slave audio data are within an audible frequency range, and the ultrasound data is within an ultrasound frequency band.

6. A control circuit for performing synchronization on playback of multiple electronic devices, the multiple electronic devices comprising a master device and at least one slave device, the master device comprising the control circuit, the control circuit comprising:
    a calibration circuit, configured to take audio data received by an Internet receiver of the master device as master audio data, and estimate a delay value between ultrasound data received by a microphone of the master device and the master audio data according to the master audio data and the ultrasound data, wherein the at least one slave device receives the master audio data from the master device to be slave audio data, and generate the ultrasound data according to the slave audio data, to make a speaker of the at least one slave device play the slave audio data and the ultrasound data; and
    a delay circuit, coupled to the calibration circuit, configured to control a delay of the master audio data according to the delay value, to generate master output audio data for being played by a speaker of the master device, synchronizing the master output audio played by the speaker of the master device with the slave audio data played by the speaker of the at least one slave device;
    wherein the at least one slave device comprises multiple slave devices, a first slave device among the multiple slave devices receives the master audio data from the master device to be first slave audio data, a second slave device among the multiple slave devices receives the master audio data from the master device to be second slave audio data, the first slave device generates first ultrasound data according to a first portion of the first slave audio data to make the first slave device play the first ultrasound data and the first slave audio data, the second slave device generates second ultrasound data according to a second portion of the second slave audio data to make the second slave device play the second ultrasound data and the second slave audio data, the first portion of the first slave audio data corresponds to a first portion of the master audio data, the second portion of the second slave audio data corresponds to a second portion of the master audio data, the calibration circuit estimates a first delay value between the first ultrasound data received by the microphone of the master device and the master audio data, the calibration circuit estimates a second delay value between the second ultrasound data received by the microphone of the master device and the master audio data, the calibration circuit determines the delay value according to the first delay value and the second delay value, and when the first delay value is greater than the second delay value, the calibration circuit sets the delay value by the first delay value.

7. The control circuit of claim 6, wherein the at least one slave device performs ultrasound modulation on at least one portion of the slave audio data to generate the ultrasound data.

8. The control circuit of claim 7, further comprising:
a demodulation circuit, configured to perform demodulation on the ultrasound data received by the microphone of the master device to generate baseband data;
wherein the calibration circuit compares the baseband data with the master audio data to estimate the delay value.

9. The control circuit of claim 6, wherein when any delay value among the first delay value and the second delay value exceeds a threshold, the control circuit sets a slave device among the first slave device and the second slave device which corresponds to said any delay value exceeding the threshold to be mute.

10. The control circuit of claim 6, wherein the master audio data and the slave audio data are within an audible frequency range, and the ultrasound data is within an ultrasound frequency band.

11. A control circuit for performing synchronization on playback of multiple electronic devices, the multiple electronic devices comprising a master device and at least one slave device, the master device comprising the control circuit, the control circuit comprising:

a calibration circuit, configured to take audio data received by an Internet receiver of the master device as master audio data, and estimate a delay value between ultrasound data received by a microphone of the master device and the master audio data according to the master audio data and the ultrasound data, wherein the at least one slave device receives the master audio data from the master device to be slave audio data, and generate the ultrasound data according to the slave audio data, to make a speaker of the at least one slave device play the slave audio data and the ultrasound data; and a delay circuit, coupled to the calibration circuit, configured to control a delay of the master audio data according to the delay value, to generate master output audio data for being played by a speaker of the master device, synchronizing the master output audio played by the speaker of the master device with the slave audio data played by the speaker of the at least one slave device;

wherein the at least one slave device comprises multiple slave devices, a first slave device among the multiple slave devices receives the master audio data from the master device to be first slave audio data, a second slave device among the multiple slave devices receives the master audio data from the master device to be second slave audio data, the first slave device generates first ultrasound data according to a first portion of the first slave audio data to make the first slave device play the first ultrasound data and the first slave audio data, the second slave device generates second ultrasound data according to a second portion of the second slave audio data to make the second slave device play the second ultrasound data and the second slave audio data, the first portion of the first slave audio data corresponds to a first portion of the master audio data, the second portion of the second slave audio data corresponds to a second portion of the master audio data, the calibration circuit estimates a first delay value between the first ultrasound data received by the microphone of the master device and the master audio data, the calibration circuit estimates a second delay value between the second ultrasound data received by the microphone of the master device and the master audio data, the calibration circuit determines the delay value according to the first delay value and the second delay value, and when the first delay value is greater than the second delay value, the calibration circuit calculates a delay difference between the first delay value and the second delay value, and controls the second slave device to apply the delay difference to the second slave audio data to generate slave output audio data for being played by a speaker of the second slave device.

* * * * *